Sept. 23, 1958 W. W. DAVIS 2,853,649

WILLIAMS MEMORY SYSTEM USING A DOUBLE-INTENSITY BEAM

Filed Nov. 26, 1952

INVENTOR
WILLIAN W. DAVIS

BY Howard L. Rose

AGENT

United States Patent Office 2,853,649
Patented Sept. 23, 1958

2,853,649

WILLIAMS MEMORY SYSTEM USING A DOUBLE-INTENSITY BEAM

William W. Davis, Riverside, Calif., assignor to the United States of America as represented by the Secretary of Commerce Application November 26, 1952, Serial No. 322,838

6 Claims. (Cl. 315—12)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

The present invention relates to cathode-ray-tube memory systems for use with electronic computers and in particular to a Williams memory system in which the intensity of the cathode-ray beam in the cathode-ray tube is varied in accordance with the information to be stored on the face of the tube.

In the design of modern computers the emphasis is always on increased speed of computation. In the past one of the factors limiting the speed of computation has been the memory system. With the advent of the Williams memory system the speed of the machines was greatly increased because the memory was much faster than that of any memory system known at that time. However, with the increasing demand for even greater speeds, the Williams system is beginning to lag behind the requirements for the newer machines. One of the factors limiting the speed of operation of this memory system is the fact that it requires a longer time to store one state on the face of the tube than it takes to store the other state. That is, if a binary "1" is represented by a dash (actually a displaced dot) it requires far more time to write this information on the face of the tube than it does to write a dot representing a binary zero.

Therefore, it is the primary object of the invention to provide a Williams memory system in which the speed of operation is greatly increased.

Another object of the invention is to provide a Williams memory system in which a beam of one intensity is used to store one state and a beam of higher intensity is used to store the other state.

Another object of the invention is to provide a very simple circuit for obtaining the double-intensity beam.

Other uses and advantages of the invention will become apparent upon reference to the specification and drawings.

Figure 1 is a graph showing the three voltages that may be obtained from the face of the cathode-ray tube when the cathode-ray beam is turned on.

In the Williams memory system the information is stored on the phosphor surface of the cathode-ray tube in the form of discrete charge distributions, each charge representing a single binary number. There are several systems of representation of binary numbers such as the double-dot system, the focus-defocus system and the dot-dash system. The present invention can be used with any one of these systems but will be described with reference to the dot-dash system.

The voltage charges on the face of the cathode-ray tube are distributed along the phosphor surface on the inside of the face of the tube. The signal that is produced when the storage areas are investigated by the electron beam is picked up by a wire screening cemented to the outside of the face of the tube. It can be seen from this that each area of the screen is capacitively coupled to a corresponding area of the phosphor surface on the inside of the tube.

Figure 1:
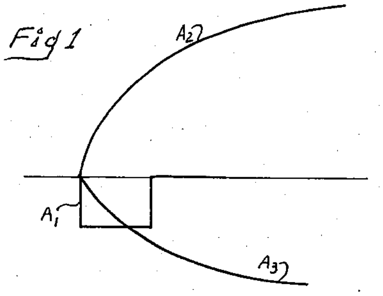

For an understanding of the improvements represented by the present system it will be necessary to describe the different voltage wave forms that are obtained from the tube when the electron beam is turned on and the exact voltages that go to make up the composite wave form. For the purposes of this discussion, the following description of the storage mechanisms will be appropriate. Assuming that the tube has no history of storage and that the electron beam is turned on and directed at a particular area, the signal that will appear on the pick-up plate will be a combination of two separate signals. The first of these, known as the beam turn-on signal, is a negative-going signal and is shown in Figure 1 as A1. This negative signal, which is almost a square wave, is due to the cloud of electrons which form in the tube just behind the phosphor surface. This electron cloud is due to the secondary emission of electrons from the surface and to some scattering of electrons in the beam itself. This cloud has the same effect on the pick-up plate as bringing a negative charge near to it, and therefore causes the plate to go negative. However, at the same time that this negative signal is being produced (that is, when the electron beam is turned on) the secondary emission from the area which is being bombarded is greater than the electrons returning to that area so that there is a net loss of electrons, causing a positive area to be produced on the phosphor surface. This accounts for the positive signal A2. The beam should be left on until this area has become sufficiently positive to attract as many electrons to the area as are leaving. This is called the equilibrium condition and is shown by the flattening of the curve A2. A third signal A3 is introduced when the beam is made to impinge upon an uncharged area that lies within a predetermined distance of a positively charged area. When this occurs, secondary electrons emitted from the point at which the beam strikes will tend to refill the charged area (that is, secondary electrons approaching the positively charged area are attracted and held by it) thereby reducing the positive charge. This action produces the negative-going signal A3. Under given circumstances then, all three signals A1, A2, and A3 may appear at the pick-up plate, giving a composite signal which is the algebraic sum of the three. These three signals, if the value of each is properly chosen, will give a positive-output signal. However, if only the A1 and the A3 appear, there will be a negative-output signal, since A1 and A3 are both negative.

Since this system can be made to produce either a positive or a negative output depending upon the manner in which the information is stored, it is completely compatible with those digital computers which use the binary system where a positive pulse represents a binary "1" and no pulse represents a binary zero. When it is desired to store a zero the charge is stored in the area of the initial beam turn-on. Then at some later time, when it is desired to interrogate the stored information, the beam will be directed to this position, strike the charged area, and a negative signal will be produced. When it is desired to store a "1," the charge is stored in an area removed by about one spot diameter from the initial beam position. Then when directed to the initial beam position, the beam will strike an uncharged area and a positive pulse will be produced on the pick-up plate.

The difficulty with this system is that it requires from five to seven times as long to write a "1" as it takes to write a zero. This arises from the fact that to produce a positive signal on the pick-up plate during a reading cycle, the beam must strike an uncharged area. Therefore when a "1" is being read, it is essential that the area upon which the electron beam initially impinges be uncharged. To accomplish this the area on which the beam will initially impinge must be refilled by the secondary emission from the displaced area during the charging of that area.

The time that the beam must be on is determined by the beam current. The current in the beam during the reading cycle (that is, when one is determining whether there was a dot or a dash written) is limited in value, since the voltage A1 is directly proportional to the current in the electron beam. If the current is made too large—in other words, of a very high intensity—the voltage A1 will become very large and regardless of the signal A2 the composite output will always be negative. Therefore it would be impossible to determine whether a binary zero or a binary "1" was written at a particular point. As a result the beam current is limited by this consideration. To sum up, in order to write in a shorter time, it is necessary to use larger beam current. Previously this has been impossible because a larger beam current destroys the ability to read. This invention proposes different beam currents for the period of sensing and for the period of writing a dash.

Figure 2:
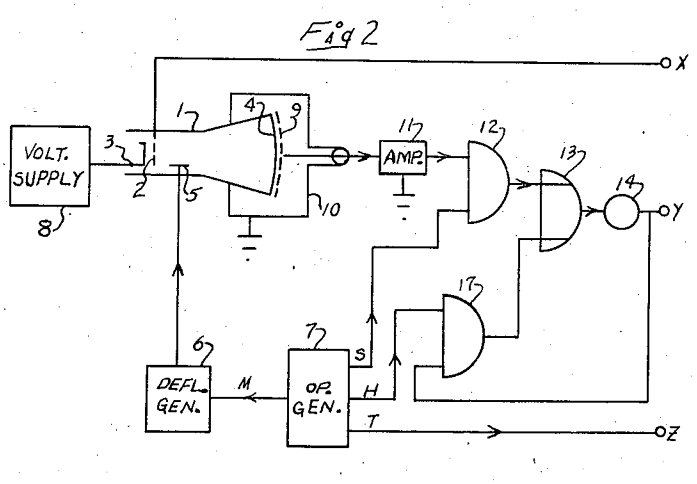
Figure 2 is a wiring diagram of a Williams memory system.
Figure 3:
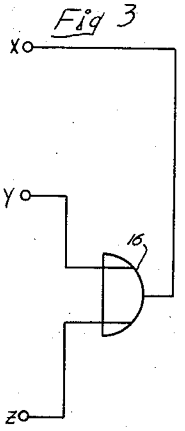
Figure 3 is a portion of the diagram of Figure 2 showing a conventional gating circuit for regenerating stored information.

Figures 2 and 3 represent a single-intensity beam system which may be used in a dot-dash system of storage.

In Figure 2 the cathode-ray tube 1 of the Williams memory system has a grid 2, a cathode 3, and a phosphor surface 4. The horizontal and vertical deflection plates, which are represented by a single plate 5, are supplied from the deflection generator 6. The voltage for the cathode of the tube is supplied by the negative high voltage source 8. The pick-up plate 9, made of ordinary wire screening, is cemented to the front of the tube so that it can capacitively pick up the signals written on the face of the tube when the signals are interrogated by the electron beam. The entire end portion of the tube is enclosed in a grounded shield 10. A shielded lead carries the output from the tube to the amplifier 11. The output of the amplifier is fed to one input of the and-gate 12, the other input being connected to receive strobe pulses S. The output of the and-gate 12 is connected to one input of the or-gate 13 and the output of the or-gate is fed to the tube 14. The output of the tube goes to the input of the and-gate 17, which has a second input connected to receive "hold" pulses H. The output of the and-gate 17 is fed to the other input of the or-gate 13.

An operations generator 7 supplies the "twitch" pulse M to the deflection generator 6, the strobe pulse S to the and-gate 12, the hold-pulse H to the and-gate 17, and the timing pulse T to the terminal Z. The deflection generator 6 supplies the positioning pulse P to the deflection plates 5. The input to grid 2 is connected to the terminal X and the other output of the tube 14 is connected to terminal Y. In a typical system, which may be used, the terminals X, Y, and Z are connected to terminals X, Y, and Z in Figure 3. In this figure Y and Z are connected to the input of or-gate 16 and X is connected to the output of or-gate 16.

Figure 5:
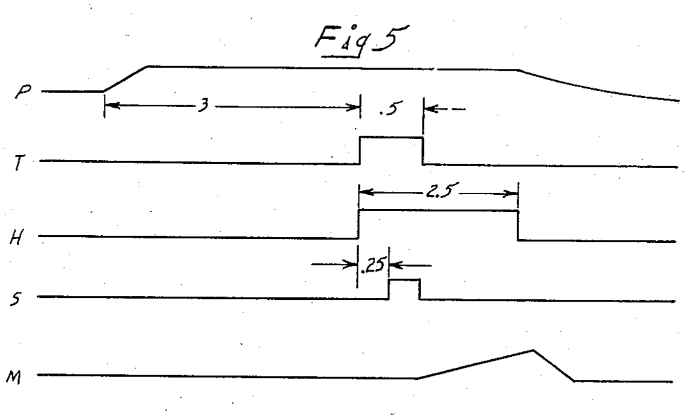
Figure 5 is a graph showing the time relation and amplitude of the control pulses for the cathode-ray tube in the circuit of Figures 2, 3, and 4.

The functioning of the operations generator is well known in the computer art, this generator being nothing more than a source of precisely determined pulses having a definite time relationship. The pulses put out by the operations and deflection generators are shown in Figure 5 and the time relationships are marked in the figure. The system will be described with reference to a reading cycle, since the differences between this cycle and the writing cycle are minor and are of no importance in this discussion.

During the period the tube is not operating the electron beam is prevented from reaching the phosphor surface 4 by the proper biasing of the grid 2. Prior to turning on the electron beam the plate wave form P is supplied to the plate 5. This wave form, which determines the beam position, has a precisely determined amplitude corresponding to the location of the information to be read. Three microseconds after the plate pulse is applied, the clock pulse T is supplied from the operations generator 7 to the or-gate 16. Since only one input is necessary to operate the or-gate the gate will pass the T pulse. The output of the or-gate is supplied to the grid 2 and turns on the beam. If a dash is detected on the phosphor surface (that is, the beam is initially positioned on an area which has been refilled but which is adjacent to an area carrying a positive charge) the output from the screen will be positive as shown in Figure 1; that is, the voltage A2 is great enough to overcome voltages A1 and A3. Since the positive pulse referred to above is above the gating level of the amplifier 11, which is set at approximately zero volts, the amplifier output will be positive. The strobe pulse has terminated, during which time the twitch the beginning of the timing pulse T and lasts for 0.25 microsecond. The coincidence of positive outputs from the amplifier and the positive strobe pulse will operate the and-gate 12 so that a positive pulse will be applied to the or-gate 13. The output of this gate is applied to the tube 14 and turns it on. The output of the tube 14 is applied to the inputs of the or-gate 16 and and-gate 17. The input to the or-gate appears at the output of this gate and is applied to the grid 2. However, since the output from the or-gate 16 lasts only as long as the strobe pulse or the T pulse, both of which terminate at the same time, means must be provided to hold on the beam of the cathode-ray tube for some predetermined time after the strobe pulse has terminated, during which time the twitch pulse M is applied to the plate 5. The so-called "twitch" pulse M is the voltage applied to the plate 5 that moves the electron beam approximately one spot diameter to some predetermined side of the original spot, thereby causing a new area of charge to be developed while the original dot area is being refilled with the secondarily emitted electrons. It is necessary, of course, to rewrite the condition found on the face of the tube, since this information may be desired by the computer at some later time. Therefore, if a positive output is detected on the face of the pick-up plate, it means that a dash signal was stored and therefore it is necessary to restore the dash signal that was originally there. As just mentioned, in order that a dash may be written the electron beam must be deflected about one diameter to the side of the original spot and therefore the beam must be held on for the duration of the twitch pulse M. The means for holding the electron beam on during the twitch pulse is the and-gate 17. This gate is turned on by the coincidence of the output from the tube 14 and the hold-pulse H. The hold pulse is applied to the gate 17 at the same time as the T pulse is applied to the gate 16 and lasts for at least 2.5 microseconds. Therefore the hold pulse lasts for at least two microseconds longer than the strobe pulse and is on for 2 microseconds of the twitch pulse period. The output from the and-gate 17 is applied to the or-gate 13 and is handled in the same way as the output from the and-gate 12. The output from the tube 14 continues to feed the input to the and-gate 17, and as long as the hold pulse is applied this part of the system is regenerative. Therefore as long as the hold pulse is turned on the grid 2 will be biased positively and the electron beam will continue to write. The length of time that the hold pulse must stay on is determined by the beam current, since the beam current determines the rate of secondary emission and the rate of secondary emission determines the rate at which the original spot is refilled. It will be noted at this point, however, that the time for actually detecting what information was written on the face of the tube is only the duration of time that the strobe pulse is on. After the strobe pulse goes off, which is 0.25 microsecond after it comes on, the and-gate 12 is no longer operative, and it is immaterial what information appears on the plate 9.

If a binary zero is detected when the beam is turned on, the output of the screen 9 is negative, and the input to the amplifier 11 will be below its gating level. As pointed out before, if there was initially a binary zero stored, only the beam turn-on signal A1, which is negative, will appear on the pick-up plate. This signal is below the gating level of the amplifier and therefore there will be no output from the amplifier. The and-gate 12 will not be turned on since only the strobe pulse input will be positive. Therefore the electron beam will remain on only for the duration of the T pulse and will be turned off before the twitch pulse M is applied to the horizontal deflection plates 5. As previously pointed out, the present invention is concerned with reducing the length of time that it takes to write a dash signal. A dash signal in this particular system takes 2.5 microseconds to write, whereas the dot signal takes 0.5 microsecond to write. As previously discussed, the only period during which the voltage output on the plate 9 is critical is during the application of the strobe pulse S.

Figure 4:
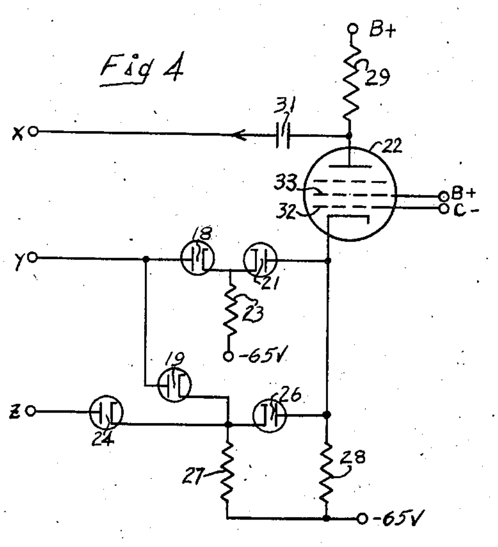
Figure 4 shows the portion of the diagram of Figure 2 which has been modified in accordance with the present invention.

The present invention contemplates that the beam current be kept at an acceptable value during the application of the strobe pulse; that is, at a value which will not cause the signal A1 to become of such a high negative magnitude that it obliterates the rest of the signals. However, since the value of the voltage on the plate 9 is unimportant after the strobe pulse is turned off, it is contemplated that the current be greatly increased during the dash-writing period and thereby cause a reduction in the length of time required for writing this signal to approximately 0.5 microsecond longer than the time required to write a dot, or a total of one microsecond for writing the dash. This is accomplished by replacing the circuit shown in Figure 3 by the circuit of Figure 4. X, Y, and Z in Figure 4 are connected to X, Y, and Z in Figure 2. The terminal Y, which is connected to receive the output of the amplifier tube 14, is connected to the diodes 18 and 19. The cathode of diode 18 is connected to the cathode of the diode 21, the plate of which is connected to the cathode of the tube 22. The cathodes of diodes 18 and 21 are connected through the resistor 23 to a —65 volt source of power. The cathode of the diode 19 is connected to the cathodes of diodes 24 and 26 and through the resistor 27 to the same —65 volt power supply. The plate of the tube 22 is connected through resistor 29 to a B+ supply. The output of the tube taken at the plate is connected through the capacitor 31 to the terminal X, which is connected subsequently to the grid 2 of the cathode 3 of tube 1. Signal grid 32 of the tube 22 is connected to a —5 volt supply of power and maintained there. The screen grid 33 is connected to a positive supply. It will be noted that in this circuit normally resistors 23, 27, and 28 are all connected in the circuit and are in parallel. This is because the plates of the diodes 21 and 26 are positive with respect to the cathodes and therefore there is conduction through the diodes and resistors to the —65 volt supply. The three resistors in parallel provide a low resistance cathode circuit, and the current flow through the tube is large, causing a low voltage at the plate of the tube 22. This biases the grid 2 of the cathode-ray tube 1 so that the electron beam is shut off. When the T pulse is applied to the diode 24, the diode passes the positive pulse, thereby driving the cathode of the diode 26 positive and blocking the diode so that the resistor 27 is taken out of the circuit. This increases the impedance of the cathode circuit of the tube 22, and the current through the tube decreases causing the voltage at the plate of the tube to rise. The bias on the grid 2 is reduced, thereby turning on the electron beam. This produces an initial current which is of the same value as the current which was used in the system described with reference to Figures 2 and 3, and therefore the relative magnitudes of the voltages A1, A2, and A3 are as shown in Figure 1, and the system can recognize whether a binary "1" or a binary zero was stored at the particular area being interrogated. If a binary "1" was stored in that area, there is an output from the and-gate 12, thereby producing an output from or-gate 13 and an output from the amplifier tube 14. A positive pulse is fed to the terminal Y and then to the plate of the diodes 18 and 19. This positive pulse will be passed by these two diodes and will cause the cathodes of the diodes 21 and 26 to become positive with respect to their plates, thereby blocking the flow of current through both diodes. Now it can be seen, not only has resistor 27 been taken out of this circuit but also the resistor 23. This will increase the impedance in the cathode circuit of tube 22 to an even greater value than when the resistor 27 was the only resistor taken out. The current flow into the tube 22 will further decrease, and the voltage at the plate will increase, allowing a much larger beam current. As previously stated, since the condition written on the face of the tube has already been sensed, and the strobe pulse is now off, it is immaterial what voltage is developed on the pick-up plate 9, since there is no longer any interest in it. The beam current can therefore be greatly increased during this period, and the time for charging the new area on the face of the tube to the proper potential and at the same time refilling the original dot signal can be reduced from approximately 2.0 microseconds to 0.5 microsecond in the system described.

It will be apparent that the embodiments shown are only exemplary and that various modifications can be made in construction and arrangement within the scope of my invention as defined in the appended claims.

I claim:

1. A memory system for storing binary digits in the form of discrete charges located in predetermined information areas on the phosphor surface of a cathode-ray tube, comprising an electron beam producing means, deflection means for directing the electron beam to a first information area when a binary zero is to be stored and for directing the electron beam to a second information area when a binary one is to be stored grid means for varying the beam current of said tube, a voltage source, means for producing a first predetermined current from said voltage source, variable impedance means responsive to the first predetermined current to apply a first voltage to said grid means to bias said cathode-ray tube to cut-off, first switching means operative when a binary zero is to be stored by said system to produce a second predetermined current from said voltage source and second switching means operative when a binary one is to be stored for producing a third predetermined current from said voltage source, said variable impedance means being responsive to the magnitudes of the second and third currents to produce second and third grid biases, respectively.

2. In an information storage system including a cathode ray tube having a phosphor surface defining a plurality of discrete chargeable storage areas adapted to be charged by the electron beam of said tube to different levels of potential, said system including means for positioning said beam to a selected one of said storage areas, and a timing pulse source synchronized with said positioning means; means initiated by said timing pulse source during a first time period for energizing said beam to a first intensity level for causing said beam to interrogate said storage area, said beam energizing means including means concurrently responsive to a signal from said interrogated storage area and said timing pulse source during a second time period for increasing the intensity of said beam to a second level for a period determined by said timing means.

3. The invention of claim 2, including means controlled by said timing pulses for gating the output from said interrogated storage area to said beam energizing means.

4. The invention of claim 2, including separate means controlled by said timing pulses at different time periods respectively for gating the output from said interrogated storage area to said beam energizing means.

5. The invention of claim 4 in which said beam energizing means comprises a variable-voltage generating device having means responsive to each of said separate gating means for determining the amplitude of the generated voltage.

6. The invention of claim 5 in which said variable-voltage generating device comprises an electron tube, and said amplitude-determining means comprises an adjustable impedance in the cathode circuit of said tube and switching means responsive to each of said separate gating means for selectively adjusting the impedance in said cathode circuit.

References Cited in the file of this patent

UNITED STATES PATENTS

| | | |
|---|---|---|
| 2,644,855 | Bradley | July 7, 1953 |
| 2,648,061 | Parker et al. | Aug. 4, 1953 |
| 2,666,137 | Cunningham et al. | Jan. 12, 1954 |
| 2,671,607 | Williams et al. | Mar. 9, 1954 |
| 2,706,246 | Klemperer | Apr. 12, 1955 |
| 2,709,230 | Williams et al. | May 24, 1955 |
| 2,777,971 | Williams et al. | Jan. 15, 1957 |
| 2,794,937 | Williams et al. | June 4, 1957 |